(12) United States Patent
Tseng et al.

(10) Patent No.: US 8,322,876 B2
(45) Date of Patent: Dec. 4, 2012

(54) ELECTRIC POWER GENERATING DEVICE AND WEARABLE OBJECT

(75) Inventors: Shen-Ko Tseng, Taipei Hsien (TW); Juinne-Ching Liao, Taipei Hsien (TW)

(73) Assignee: Shen-Ko Tseng, Taipei Hsien (TW)

( * ) Notice: Subject to any disclaimer, the term of this patent is extended or adjusted under 35 U.S.C. 154(b) by 373 days.

(21) Appl. No.: 12/700,715

(22) Filed: Feb. 4, 2010

(65) Prior Publication Data
US 2010/0301749 A1 Dec. 2, 2010

(30) Foreign Application Priority Data
Jun. 2, 2009 (CN) .......................... 2009 1 0008619

(51) Int. Cl.
*F21V 21/08* (2006.01)

(52) U.S. Cl. ......... 362/103; 362/192; 362/411; 362/570
(58) Field of Classification Search .................. 362/103, 362/183, 192–193, 205, 253, 276, 295, 394, 362/411, 570, 802; 310/73
See application file for complete search history.

(56) References Cited

U.S. PATENT DOCUMENTS

| | | | |
|---|---|---|---|
| 5,475,572 A * | 12/1995 | Tseng ........................... | 362/545 |
| 7,178,929 B2 * | 2/2007 | Guzman ....................... | 362/103 |
| 7,207,688 B2 * | 4/2007 | Yuen et al. .................... | 362/103 |
| 7,600,884 B2 * | 10/2009 | Vitulli et al. .................. | 362/103 |
| 7,699,499 B2 * | 4/2010 | Liao .............................. | 362/276 |
| 8,056,269 B2 * | 11/2011 | Beers et al. ..................... | 36/137 |
| 2006/0198121 A1 * | 9/2006 | Thorpe et al. ................. | 362/103 |
| 2007/0180737 A1 * | 8/2007 | DiBenedetto et al. .......... | 36/132 |
| 2007/0201221 A1 * | 8/2007 | Cherdak et al. ............... | 362/103 |
| 2007/0236915 A1 * | 10/2007 | Chen ............................. | 362/103 |

* cited by examiner

*Primary Examiner* — Tung X Le

(57) ABSTRACT

The invention discloses an electric power generating device applied on a wearable object. The electric power generating device comprises a transmission unit, a magnetic permeable member, a magnetic member, a core, and a coil. The transmission unit transfers an external force received by the wearable object to a driving force. The core is configured in the wearable object and has a first end. The coil is coupled to the core. The magnetic permeable member is configured in the wearable object to receive the driving force and move by the driving force. The magnetic member is configured on the magnetic permeable member and near the first end. When the magnetic permeable member pushes the magnetic member to move relatively to the first end through the driving force, the magnetic flux in the core varies to lead the coil to induce an induced electromotive force.

20 Claims, 9 Drawing Sheets

ELECTRIC POWER GENERATING DEVICE AND WEARABLE OBJECT

BACKGROUND OF THE INVENTION

1. Field of the Invention

The present invention relates generally to an electric power generating device and a wearable object applying the electric power generating device, and more particularly, the present invention relates to an electric power generating device which generates electric power by means of the induced electromotive force induced by the external force and a wearable object making use of the electric power generating device.

2. Description of the Prior Art

While moving about during night time, insufficient lighting easily results in an accident. Such as when a person walk or jog along the roadside at night, they could happen to fall down and get hurt owing to the blurred version, or even been crashed by a car. Moreover, it could even happen to fall over and get hurt while mountain-climbing at dawn because the road condition is not clearly seen. Therefore it is important to take along a lighting apparatus at night or in a situation with insufficient light.

People in general often take a portable luminous apparatus such as an electric torch for lighting. However, it is inconvenient to take an electric torch while doing an intense activity such as jogging. Thus there are many luminous appendages such as digital watches for exercisers, sports clothes, sports shoes, wristlets and kneecaps on the market, which fall under the category of wearable objects. The luminous wearable object can light while users are moving about and the size and the weight of the luminous apparatus will not affect users' actions, thus is suitable for lighting while doing intense activities.

However, each of the luminous apparatuses mentioned above is battery powered. Once the batteries of the luminous apparatuses are out of electricity or broken, the luminous apparatuses lose their functions, so that users have to check the electric quantity of the batteries of the luminous apparatuses frequently to ensure normal operation. On the other hand, the wasted batteries and their recovery would cause an environmental problem.

SUMMARY OF THE INVENTION

Accordingly, the main aspect of the present invention is to provide an electric power generating device that can be categorized as a wearable object, which could induce an induced electromotive force by means of electromagnetic induction in a coil to generate electricity and replace batteries, to solve the problems mentioned above. However, in practice, the electromagnetic force induced by the electric power generating device of the invention can provide not only the luminous apparatus but also other electronic components (e.g. alarms, buzzers, pedometers, etc) with electricity.

According to an embodiment, the electric power generating device could be applied to a wearable object, and the electric power generating device comprises a magnetic permeable member, a first magnetic member, a core and a first coil. The magnetic permeable member is configured in the wearable object, for receiving a first external force from the wearable object. By means of the first external force, the magnetic permeable member could rotate around an axis. The first magnetic member could be configured on the magnetic permeable member. When the magnetic permeable member rotates around the axis, the first magnetic member also rotates with the magnetic permeable member. The core has a first end close to the first magnetic member, and the first coil is coupled to the core.

In the embodiment, when the magnetic permeable member receives the first external force and rotates around the axis, the magnetic permeable member could push the first magnetic member to rotate around the axis. Owing to the rotation of the first magnetic member, the distance between the first magnetic member and the first end of the core varies, which results in the magnetic flux varying in the core to induce a first induced electromotive force in the first coil.

Furthermore, the electric power generating device further comprises an electric power transforming module coupled to the first coil for transforming the first induced electromotive force into electricity and the electricity is transmitted to a lighting unit of the wearable object to drive the lighting unit to light.

Another aspect of the invention is to provide a wearable object which the required electricity for the wearable object lighting is supplied by an electric power generating device instead of batteries.

According to an embodiment, the wearable object of the invention comprises an electric power generating device, and the electric power generating device further comprises a magnetic permeable member, a first magnetic member, a core and a first coil.

In the embodiment, the magnetic permeable member is configured in the wearable object, for receiving a first external force from the wearable object. By means of the first external force, the magnetic permeable member could rotate around an axis. The first magnetic member could be configured on the magnetic permeable member. When the magnetic permeable member rotates around the axis, the first magnetic member also rotates with the magnetic permeable member. The core has a first end close to the first magnetic member, and the first coil is coupled to the core.

When the magnetic permeable member receives the first external force and rotates around the axis, the magnetic permeable member could push the first magnetic member to rotate around the axis. Owing to the rotation of the first magnetic member, the distance between the first magnetic member and the first end of the core varies, which results in the magnetic flux varying in the core to induce a first induced electromotive force in the first coil.

Furthermore, the electric power generating device could further comprise an electric power transforming module coupled to the first coil for transforming the first induced electromotive force into electricity and the electricity is transmitted to a lighting unit of the wearable object to drive the lighting unit to light.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
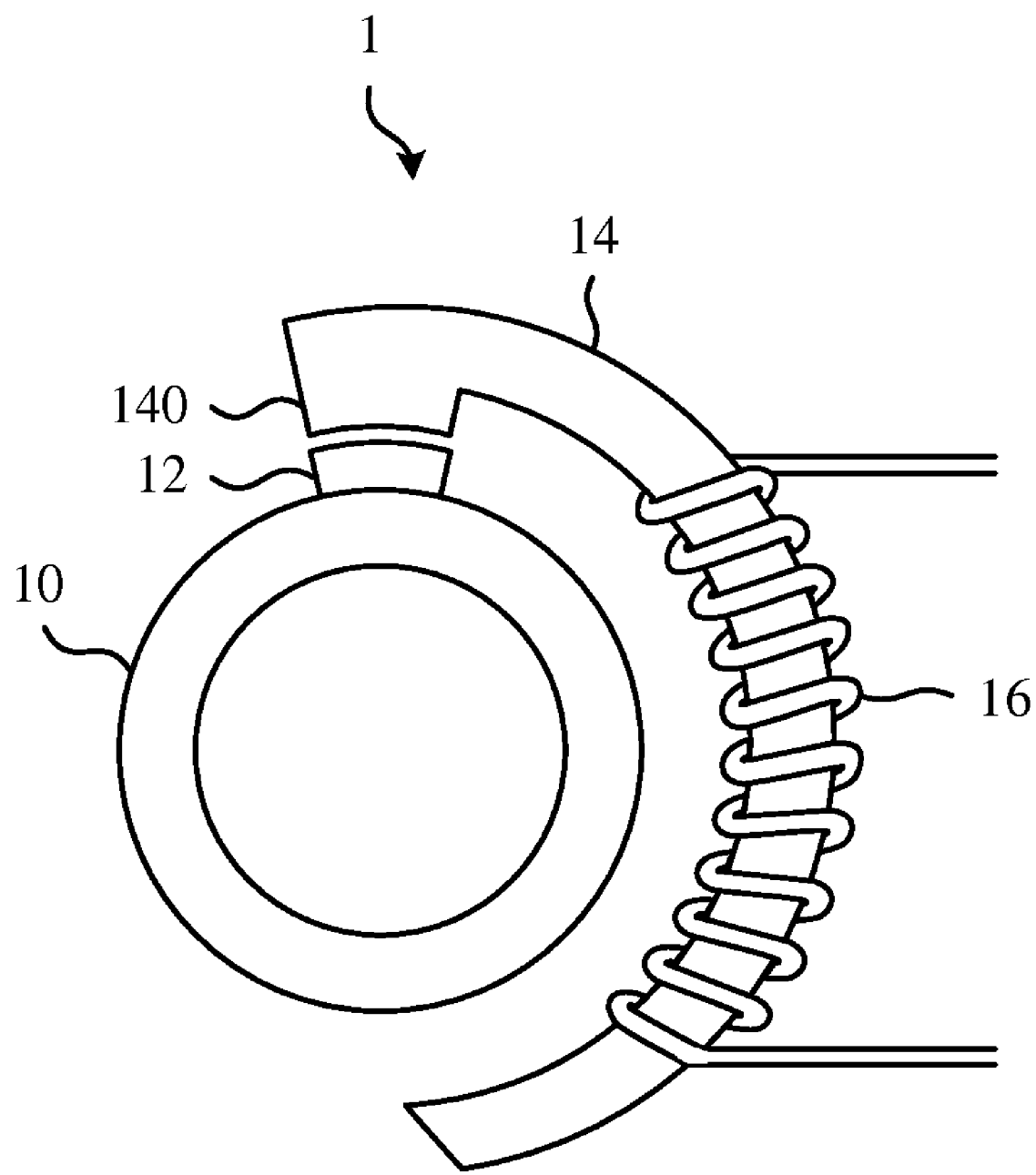
FIG. 1 illustrates an electric power generating device according to an embodiment of the invention.

Please refer to FIG. 1. FIG. 1 illustrates an electric power generating device 1 according to an embodiment of the invention. The electric power generating device 1 could be applied to wearable objects, such as shoes, clothes, hats, belts, etc., as the power source of a lighting unit of a wearable object. As illustrated in FIG. 1, the electric power generating device 1 comprises a magnetic permeable member 10, a first magnetic member 12, a core 14 and a first coil 16. The magnetic permeable member 10 could be configured in the wearable object. The first magnetic member 12 could be configured on the magnetic permeable member 10. The core 14 could also be configured in the wearable object and the core 14 has a first end 140 close to the first magnetic member 12, and the first coil 16 is coupled to the core 14.

In the embodiment, the magnetic permeable member 10 could receive an external force from the wearable object and then rotates around its axis. When the magnetic permeable member 10 rotates, the first magnetic member 12 could be pushed to rotate. Owing to the rotation of the first magnetic member 12, the distance between the first magnetic member 12 and the first end 140 of the core 14 varies, which results in the magnetic flux varying in the core 14 to induce a first induced electromotive force 160 in the first coil 16. According to another embodiment, the electric power generating device 1 could further comprise an electric power transforming module for transforming the first induced electromotive force 160 into electricity and the electricity could be transmitted to a lighting unit of the wearable object to drive the lighting unit to light.

Figure 2:
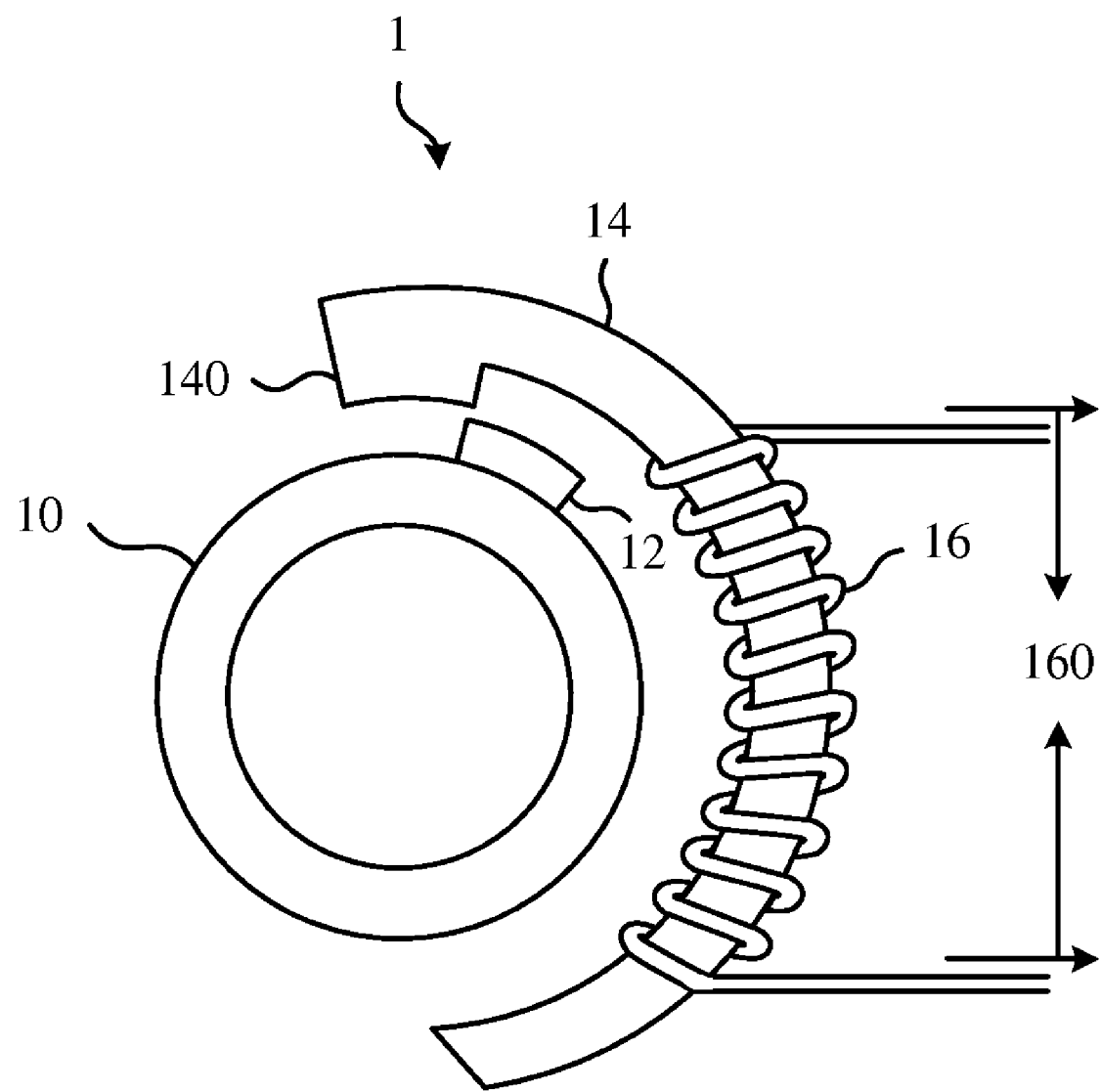
FIG. 2 illustrates the rotation of a magnetic permeable member of the electric power generating device in FIG. 1.

Please refer to FIG. 2. FIG. 2 illustrates the rotation of a magnetic permeable member 10 of the electric power generating device 1 in FIG. 1. As illustrated in FIG. 2, when the magnetic permeable member 10 receives the external force and rotates clockwise around the axis (could rotate counterclockwise depending on the users' requirement or the design). That makes the first magnetic member 12 deviate from the original position and moves away from the first end 140, which leads to the magnetic line passing through the first magnetic member 12 and the first end 140 to lose its transmission medium, so that the magnetic flux in the core 14 is varied. A first induced electromotive force 160 is induced in the first coil 16 by means of the varied magnetic flux.

Additionally, according to the embodiment, when the external force received by the magnetic permeable member 10 disappears, the first magnetic member 12 and the first end 140 could attract each other to return the first magnetic member 12 to its original position (as illustrated in FIG. 1). The magnetic flux is also varied when the first magnetic member 12 is returned to its original position, so that the first induced electromotive force 160 is induced in the first coil 16 again by means of the varied magnetic flux. Please notice that the direction of the varied magnetic flux while the external force exerting upon the magnetic permeable member 10 and that of the varied magnetic flux while the external force disappearing are opposite, which means the directions of the first induced electromotive forces 160 induced in the first coil 16 in the two situations are different.

Please notice that in practical applications, the external force form the wearable object could directly or indirectly push the magnetic permeable member 10 to rotate. If the external force indirectly pushes the magnetic permeable member 10 to rotate, an external force transmission unit could be configured in the wearable object to transfer the indirect external force to a direct driving force which could push the magnetic permeable member 10 to rotate.

Figure 3:
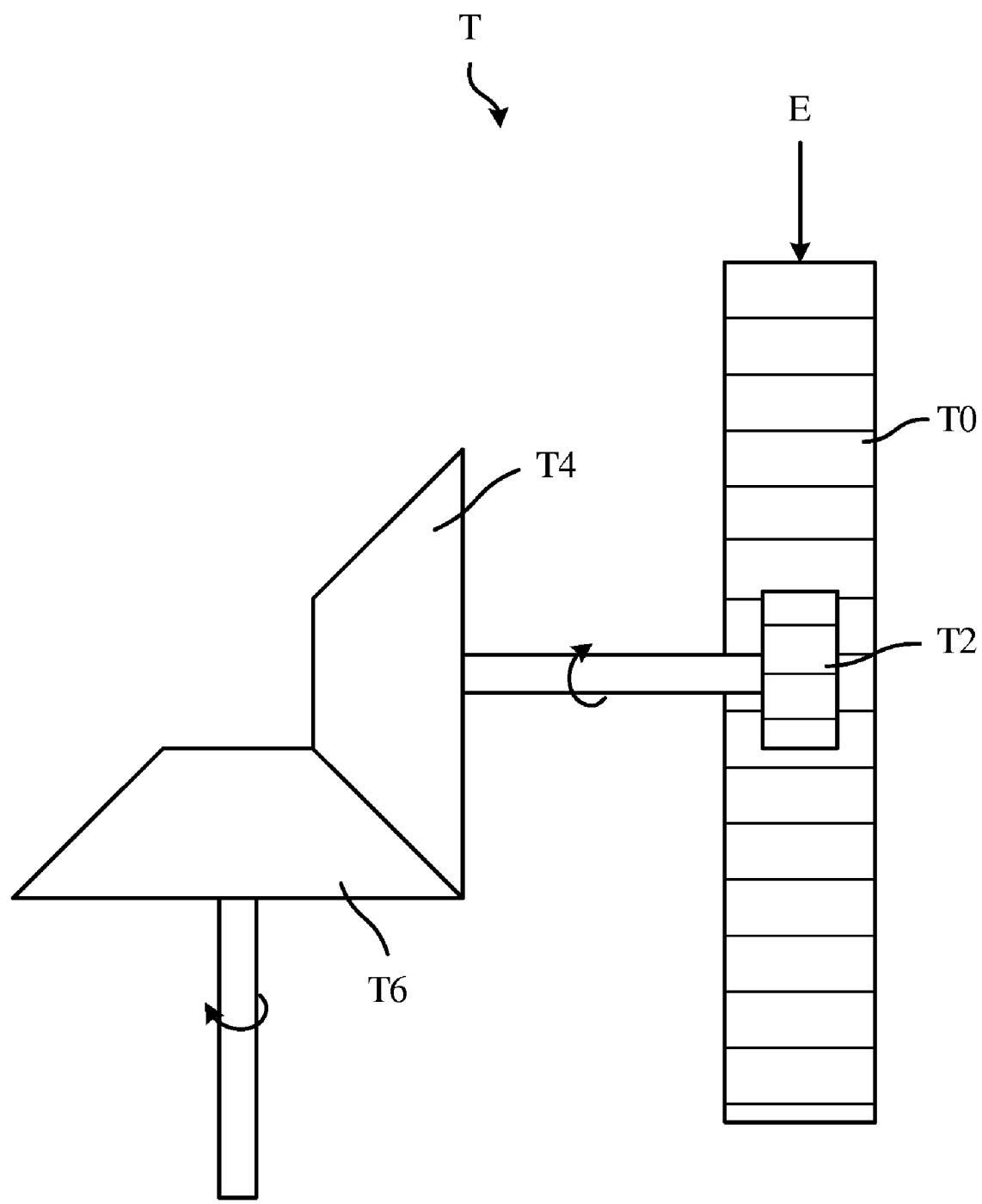
FIG. 3 illustrates an external force transmission unit applied to the electric power generating device according to another embodiment of the invention.

Please refer to FIG. 3. FIG. 3 illustrates an external force transmission unit T according to another embodiment of the invention. The external force transmission unit T could receive an external force E and transfers the external force E to a direct driving force which could push the magnetic permeable member 10 to rotate as mentioned in the previous embodiment. As illustrated in FIG. 3, the external force transmission unit T comprises a rack T0, a gear wheel T2, a first bevel gear T4 and a second bevel gear T6. Wherein the rack T0 and the gear wheel T2 occlude with each other, and when the rack T0 receives the external force E and moves along the direction of the external force E, the rack T0 pushes the gear wheel T2 to rotate. Moreover, the gear wheel T2 and the first bevel gear T4 are coaxial, thus the first bevel gear T4 rotates with the gear wheel T2. Meanwhile, the second bevel gear T6 and the first bevel gear T4 occlude with each other and rotate correspondingly. Practically, the axis of the second bevel gear T6 could connect the axis of the magnetic permeable member 10 mentioned in the previous embodiment, thus the magnetic permeable member 10 could be pushed to rotate accordingly.

Figure 4:
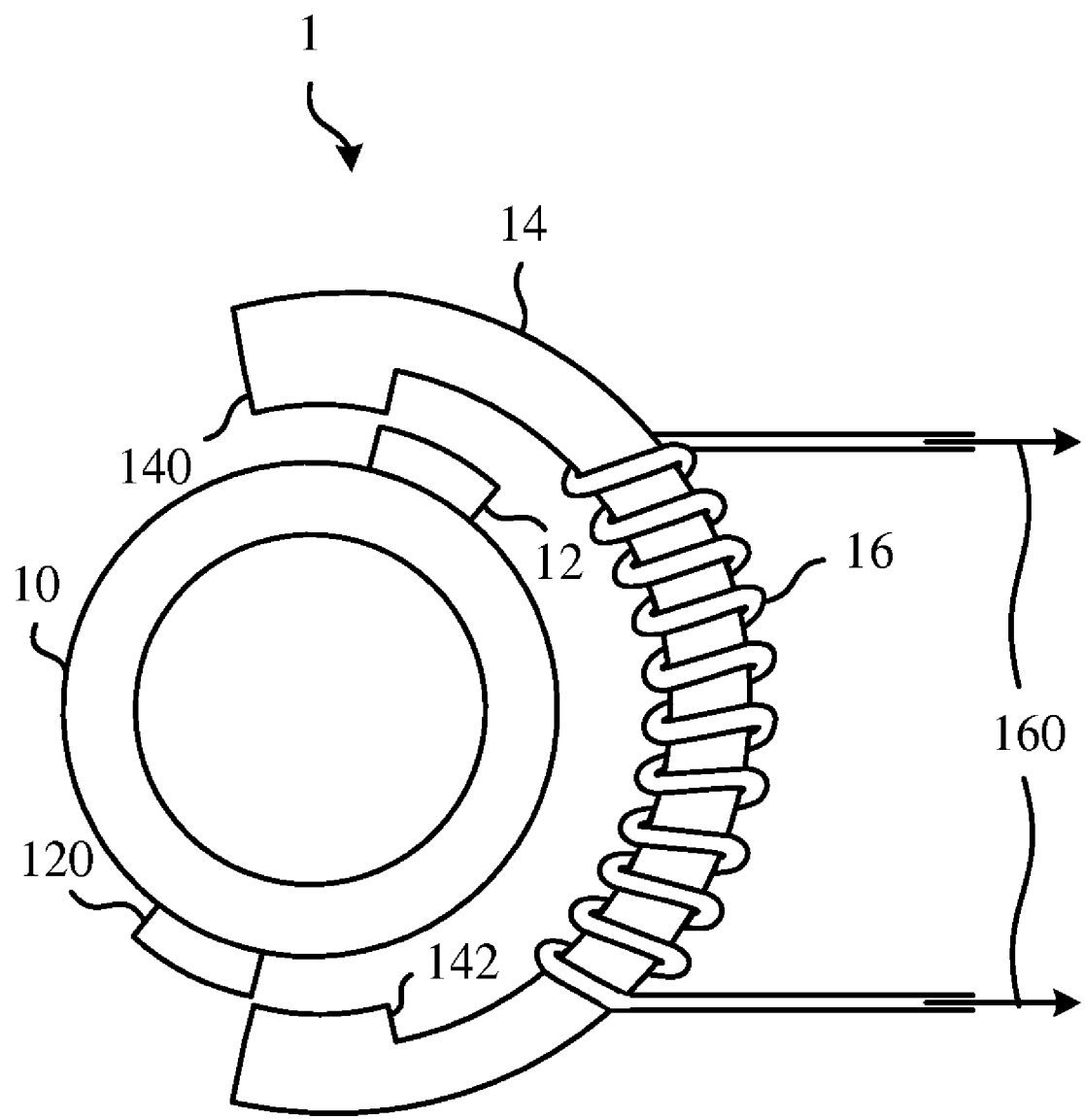
FIG. 4 illustrates an electric power generating device according to another embodiment of the invention.

Please refer to FIG. 4. FIG. 4 illustrates an electric power generating device 1 according to another embodiment of the invention. As illustrated in FIG. 4, in addition to those units mentioned above, the electric power generating device 1 further comprises a second magnetic member 120 configured on the magnetic permeable member 10 and the second magnetic member 120 is close to a second end 142 of the core 14. Therefore, the magnetic line could form a magnetic loop among the magnetic permeable member 10, the first magnetic member 12, the first end 140, the core 14, the second end 142 and the second magnetic member 120. Similarly, when the magnetic permeable member 10 receives an external force to rotate, the relative position between the second magnetic member 120 and the second end 142 of the core 14 are also varied, thus the magnetic flux in the core 14 varies more sharply than that with only the first magnetic member 12, so as to strengthen the first induced electromotive force 160 induced in the first coil 16. Please notice that in practical applications, the number of magnets configured on the magnetic permeable member depends on the requirement of users of the design, but is not limited to the number of the embodiment or the previous embodiment.

Figure 5:
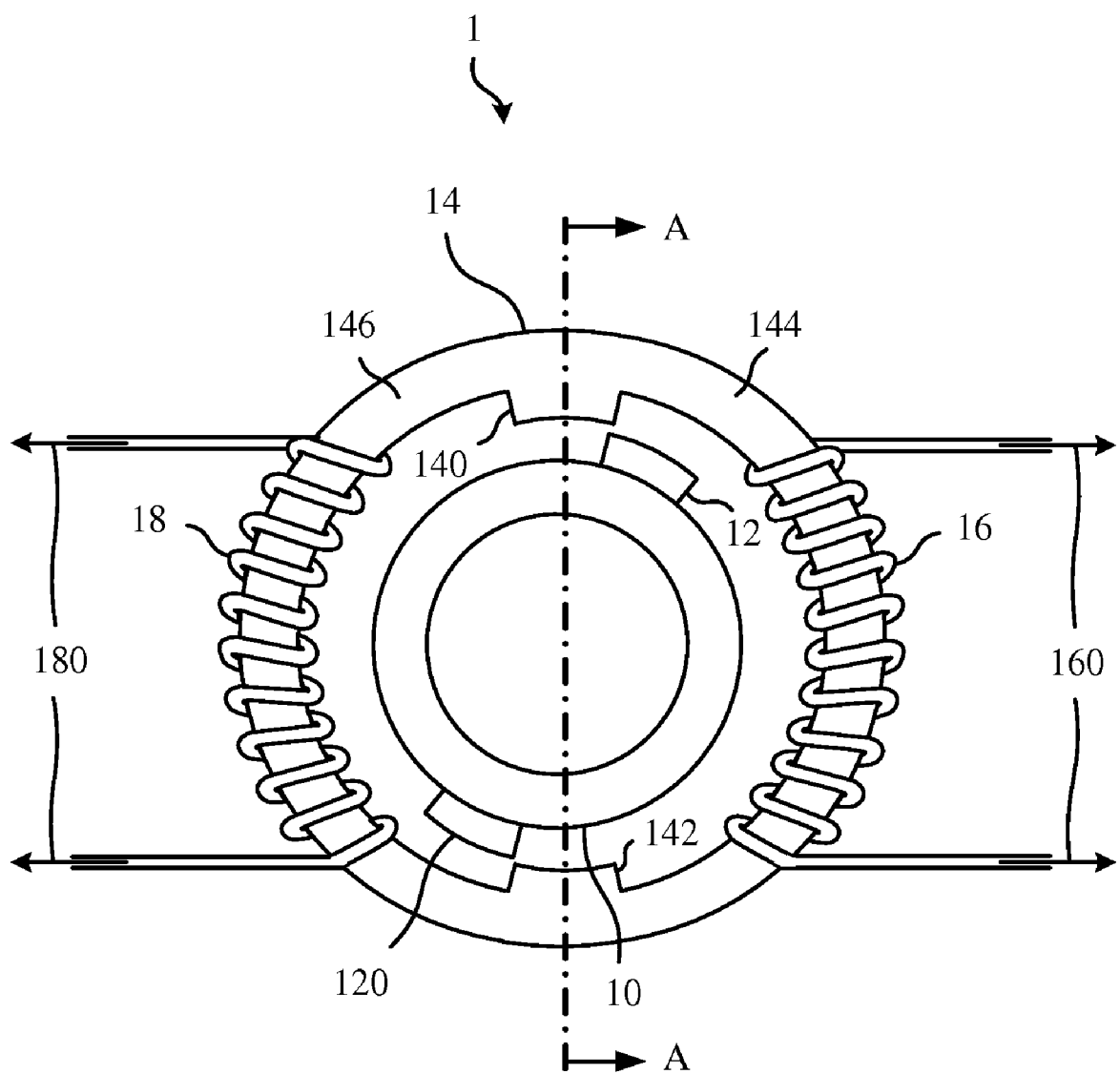
FIG. 5 illustrates an electric power generating device according to another embodiment of the invention.

Please refer to FIG. 5. FIG. 5 illustrates an electric power generating device 1 according to another embodiment of the invention. As illustrated in FIG. 5, the difference between this embodiment and the previous embodiment is that the electric power generating device 1 further comprises a second coil 18 coupled to the core 14. Moreover, the core 14 in the embodiment further comprises a first arm 144 and a second arm 146 which are capable of being wound around by the first coil 16 and the second coil 18 respectively.

In the embodiment, the magnetic flux could form a magnetic loop among the magnetic permeable member 10, the first magnetic member 12, the first end 140, the first arm 144, the second end 142 and the second magnetic member 120, and form a second magnetic loop among the magnetic permeable member 10, the first magnetic member 12, the first end 140, the second arm 146, the second end 142 and the second magnetic member 120. When the magnetic permeable member 10 receives an external force to rotate, the magnetic flux of the first magnetic loop and the second magnetic loop among the first arm 144 and the second arm 146 of in the core 14 vary, so that a first induced electromotive force 160 is induced in the first coil 16 and a second induced electromotive force 180 is induced in the second coil 18.

Similarly, in another embodiment, the second coil 18 could be also coupled to an electric power transforming module, so the second induced electromotive force 180 induced in the second coil 18 could be transferred into electricity. The electricity is then transmitted to a lighting unit of the wearable object to drive the lighting unit to light. The circle number of the first coil 16 is substantially the same as that of the second coil 18, so that the induced first induced electromotive force 160 is substantially the same as the induced second induced electromotive force 180. However, the circle number of the first coil could be different from that of the second coil in practical applications, which depends on users' requirement and the design.

Practically, the magnetic permeable member 10 and the core 14 could be made of, but not limited to, magnetic conductive materials such as iron. Additionally, the first magnetic member 12 could be a magnet, and the coil could be formed by copper conducting wire surrounded with the core 14. Furthermore, the shape of the magnetic permeable member 10 and the core 14 could be determined according to users' requirement or the design, but not limited to the embodiment mentioned in the specification.

Practically, the electric power generating device mentioned above could be round shaped, and the radius of the electric power generating device could be 27.75 mm and the height could be 5 mm. The circle number of the first coil and the second coil could be 3000, and the diameter of the copper wire forming the first coil and the second coil could be 0.12 mm. The magnetic conductivity of the first magnetic member and the second magnetic member could be substantially 1.04457, and their magnetic retentivity could be 1.1 tesla. Moreover, the vacant spaces between each of the units could be 0.2 mm so that the first magnetic member and the second magnetic member will not rub against or hit the core and the coil when the magnetic permeable member rotates. Please notice that the details mentioned above is taking an embodiment for an example, not a limitation.

Figure 6:
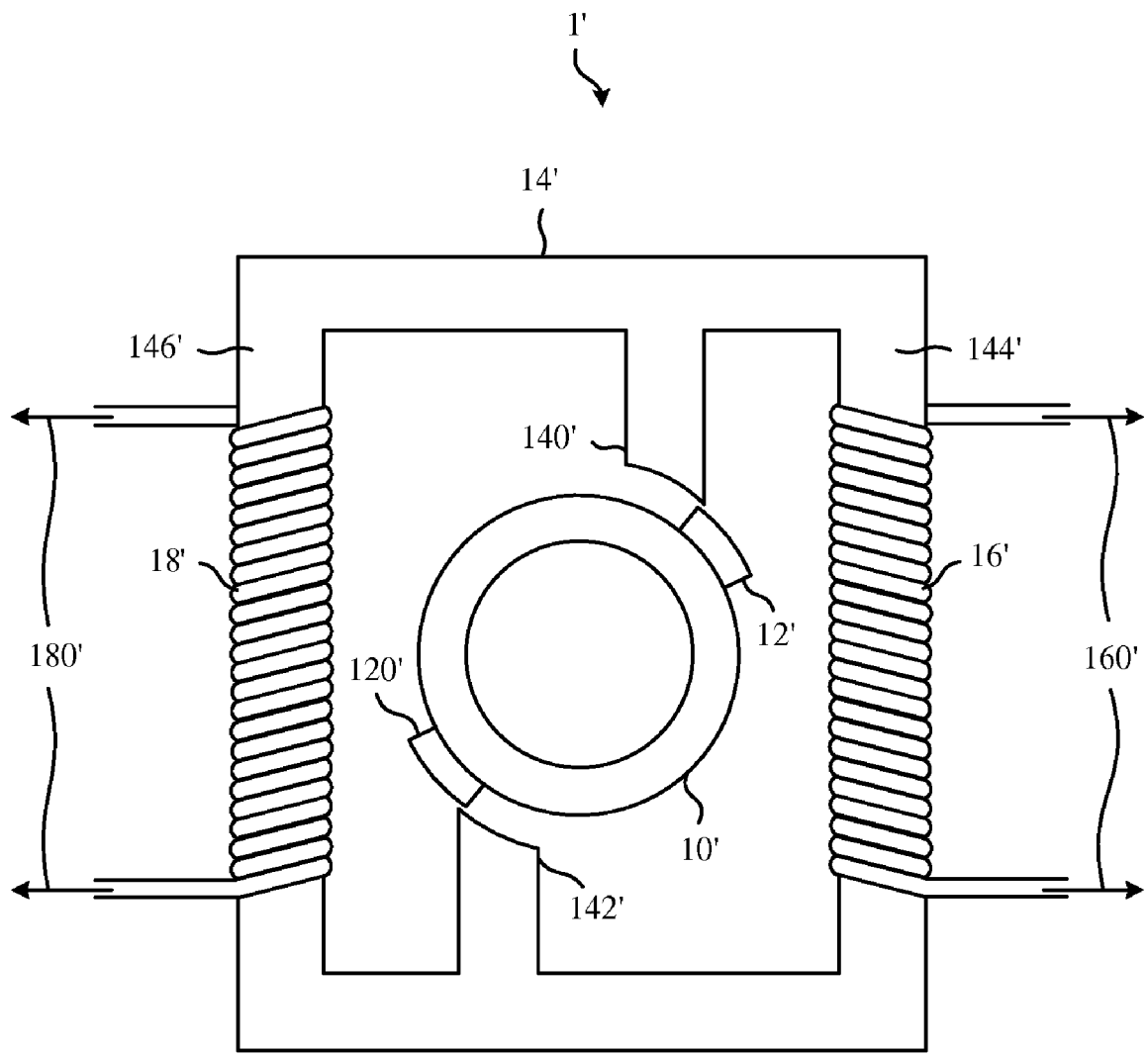
FIG. 6 illustrates an electric power generating device according to another embodiment of the invention.

Please refer to FIG. 6. FIG. 6 illustrates an electric power generating device 1' according to another embodiment of the invention. As illustrated I FIG. 6, the electric power generating device 1' comprises a magnetic permeable member 10', a first magnetic member 12', a second magnetic member 120', a core 14', a first coil 16' and a second coil 18'.

The difference between the embodiment and the previous embodiment is that the shape of the core 14' in the embodiment is different from that of the core 14 in the previous embodiment. The first magnetic member 12' is close to the first end 140' of the core 14' and the second magnetic member 120' is close to the second end 142' of the core 14'. The first coil 16' and the second coil 18' are coupled to the first arm 144' and the second arm 146' of the core 14' respectively, thus the magnetic line forms a first magnetic loop among the magnetic permeable member 10', the first magnetic member 12', the first end 140', the first arm 144', the second end 142' and the second magnetic member 120', and forms a second magnetic loop among the magnetic permeable member 10', the first magnetic member 12', the first end 140', the second arm 146', the second end 142' and the second magnetic member 120'.

In the embodiment, the magnetic permeable member 10' could receive an external force from the wearable object and rotates clockwise around its axis so as to push the first magnetic member 12' and the second magnetic member 120' to change the distance between the first magnetic member 12' and the first end 140' and the distance between the second magnetic member 120' and the second end 142'. The distance variation mentioned above changes the magnetic flux in the first arm 144' and the second arm 146' of the core 14', so that the first induced electromotive force 160' is induced in the first coil 16' and the second induced electromotive force 180' is induced in the second coil 18' owing to the variation of magnetic flux.

Figure 7:
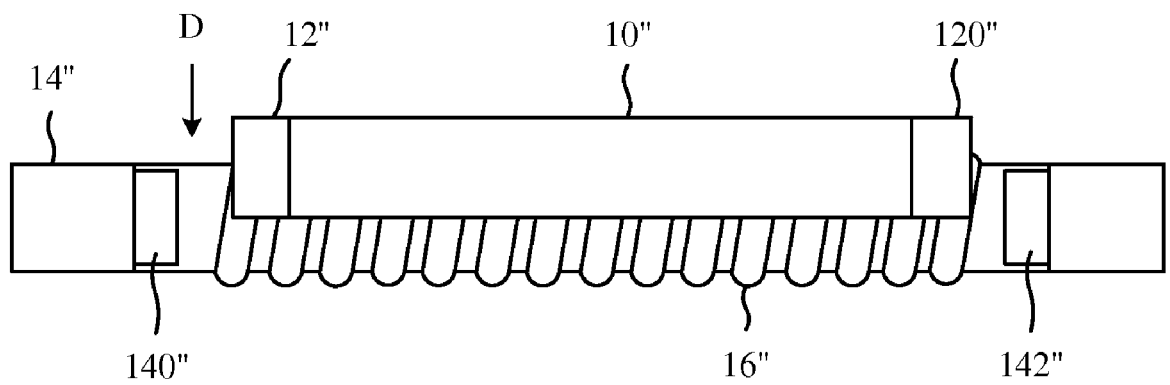
FIG. 7 is a cross-sectional view of an electric power generating device according to another embodiment of the invention.

Please refer to FIG. 5 and FIG. 7 simultaneously. FIG. 7 is a cross-sectional view of an electric power generating device 1" according to another embodiment of the invention. In the embodiment, FIG. 7 shows the cross-sectional view along the A-A hatches of the electric power generating device 1 in FIG. 5. The difference between the embodiment and the previous embodiment is that the magnetic permeable member 10" could receive an external force from the wearable object and move along direction D to push the first magnetic member 12" and the second magnetic member 120" to move relatively to the first end 140" and the second end 142" of the core 14", which results in the magnetic flux varied in the core 14." Please notice that the units in the embodiment are substantially performing the same function as the corresponding units in the previous embodiment, so that the details will not be described again here.

To summarize, the electric power generating device of the invention could be applied to wearable objects such as sports clothes, sports shoes, wristlets and kneecaps, etc. And by means of the wearable object regularly being forced (e.g. the normal force exerted on the sport shoes while walking or running), the magnetic member and the magnetic permeable member of the electric power generating device to rotate or move straightly relatively to a core, which results in the magnetic flux varying in the core to induce an induced electromotive force which is then used as the power source of a lighting unit. Because the lighting unit of the invention is not battery powered, the problems in the prior art could be solved.

Figure 8:
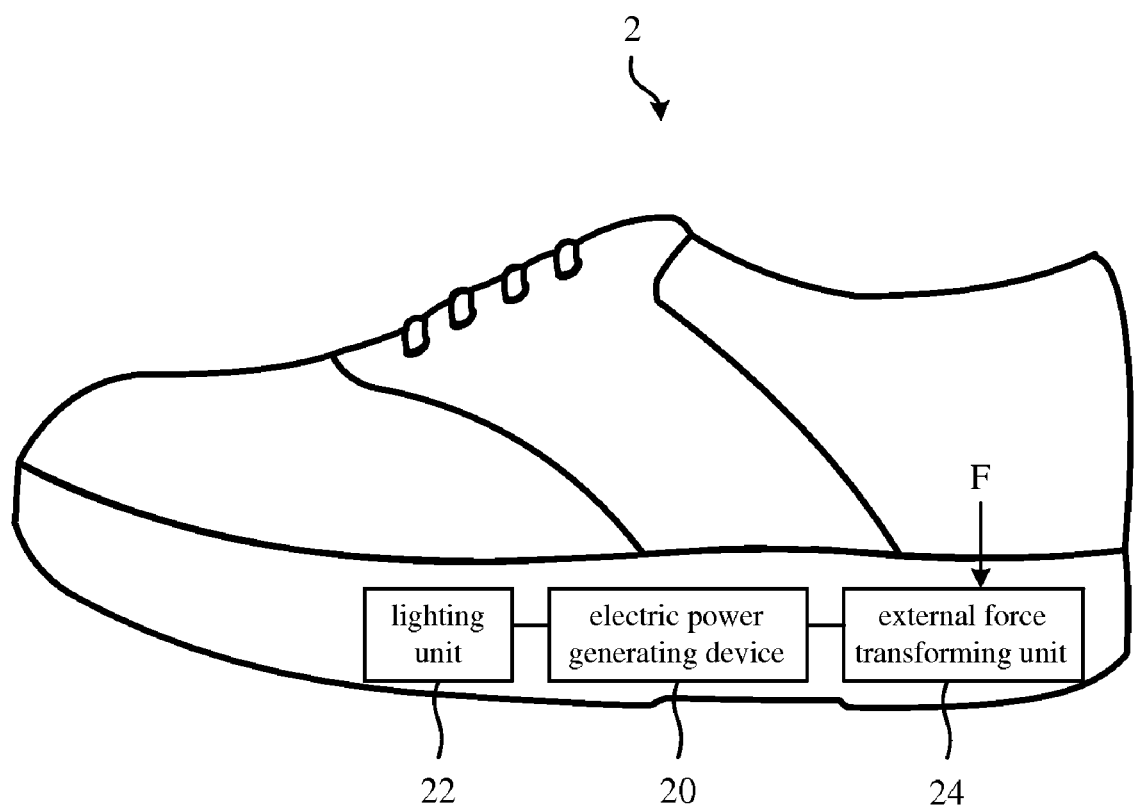
FIG. 8 illustrates a wearable object according to an embodiment of the invention.

Please refer to FIG. 8. FIG. 8 illustrates a wearable object 2 according to an embodiment of the invention. As illustrated in FIG. 8, the wearable object 2 is a shoe, which comprises an electric power generating device 20 and a lighting unit 22, wherein the electric power generating device 20 is coupled to the lighting unit 22 and supplies power source to the lighting unit 22.

In the embodiment, the inner structure of the electric power generating device 20 is the same as that of in the previous embodiment, that is to say, the electric power generating device 20 could comprise units such as a magnetic permeable member, a first magnetic member, a second magnetic member, a core, a first coil, a second coil and an electric power transforming module. Because the function of each unit is the same as the corresponding unit in each of the previous embodiments mentioned above, the details will not be described again here.

When users wear the wearable object 2 to do actions such as walking, running or jumping, the normal force F exerted on the wearable object 2 by users could be transferred to driving force by an external force transmission unit 24, so as to drive the magnetic permeable member to rotate. The magnetic flux in the core is varied because each of the magnetic members is pushed to rotate with the magnetic permeable member. Meanwhile, an induced electromotive force could be induced in each of the coils coupled to the core, and inputted to the electric power transforming module. The induced electromotive force is then transferred to power source by the electric power transforming module to drive lighting unit 22 to light.

On the other hand, when users stop exerting the normal force F, the magnetic member and the core will attract to each other to make the magnetic member to return to its original position, and the magnetic flux is varied again, so that an induced electromotive force is induced in the coil again and is used as the power source of the lighting unit 22.

Please notice that the induced electromotive force mentioned above may be insufficient for the lighting unit in some applications because of different types of the lighting units in the wearable object (e.g. light emitting diode or laser diode), so the induced electromotive force induced by one magnetic flux variation may not be enough to drive the lighting unit to light. Therefore, the electric power generating device could further comprise an electric energy storing unit such as a capacitance for storing electric energy. After the induced electromagnetic force is induced several times and the electric energy storing in the capacitance is sufficient, the electric energy could be transmitted to the lighting unit to drive the lighting unit to light.

Figure 9:
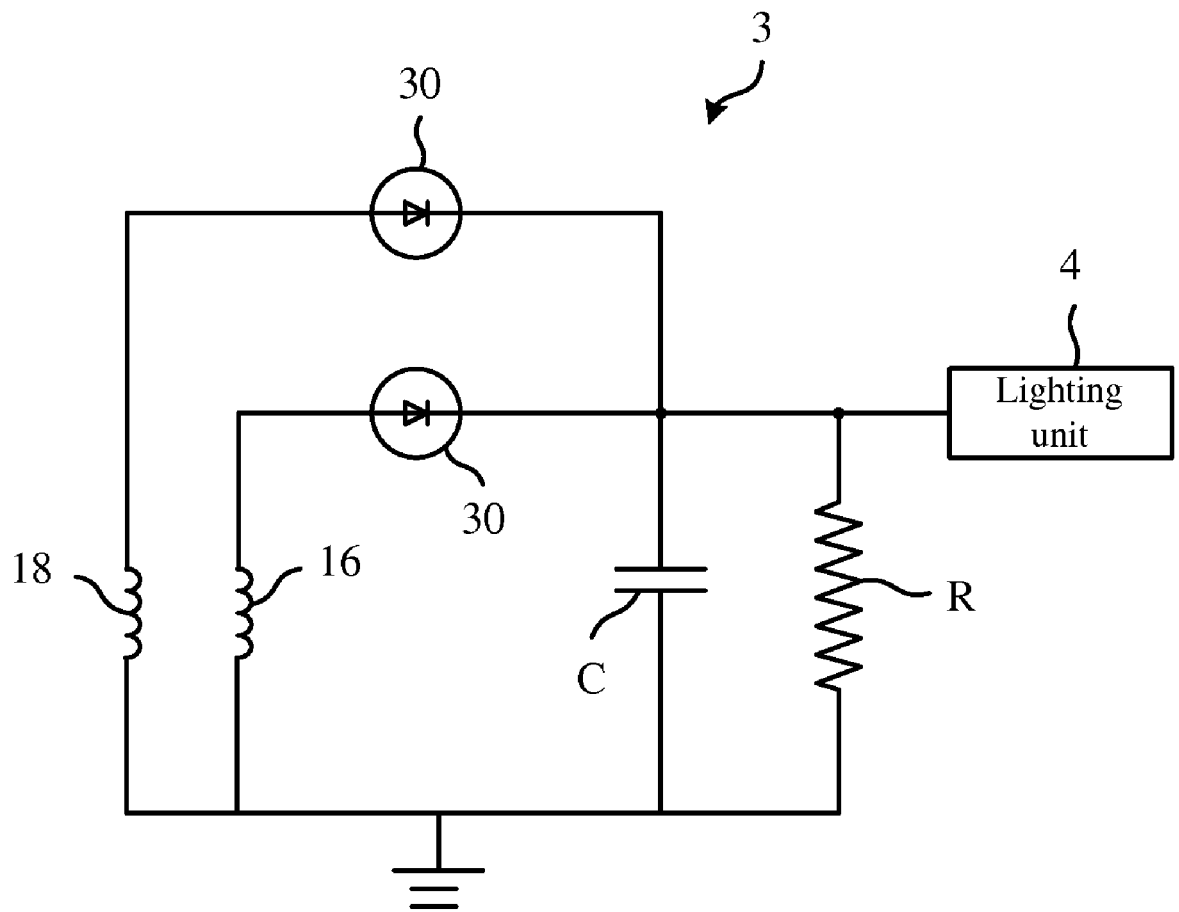
FIG. 9 illustrates an electric power transforming module according to an embodiment of the invention.

Please refer to FIG. 5 and FIG. 9 simultaneously. FIG. 9 illustrates an electric power transforming module 3 according to an embodiment of the invention. The electric power transforming module 3 is applied to the electric power generating device in the FIG. 5. As illustrated in FIG. 9, the electric power transforming module 3 comprises two diodes 30, a capacitance C and a resistance R, wherein the two diodes 30 are electrically connected to the first coil 16 and the second coil 18 respectively, and the capacitance C and the resistance R form a RC circuit electrically connected to the two diodes 30. Practically, the number of diode 30 could depend on the number of coil, but is not limited to the embodiment.

In the embodiment, the induced electromotive force induced in the first coil 16 and the second coil 18 by means of the magnetic flux variation in the core (as the core 14 shown in FIG. 5) is outputted to the circuit mentioned above as a form of current. By the diodes 30 and the RC circuit, the current is regulated and filtered and then outputted to the lighting unit 4 to drive the lighting unit 4 to light. Therefore, the induced electromagnetic force could be transferred to power source (current) by the electric power transforming module, and the power source is inputted to the lighting unit to drive the lighting unit to light.

Compared to the prior art, the wearable object in the invention could make use of a magnetic permeable member, magnetic members, a core and coils to transfer an external force exerted on the wearable object by users to power source to supply the lighting unit to light or other electric goods to operate. Because electricity is generated through transferring the external force exerted on the wearable object worn by users while acting (e.g. sporting shoes wore by users while jogging) into power source, which substitutes the limited battery power in the prior art. It is obvious that the invention eliminates the disadvantages in the prior art.

Although the present invention has been illustrated and described with reference to the preferred embodiment thereof, it should be understood that it is in no way limited to the details of such embodiment but is capable of numerous modifications within the scope of the appended claims.

What is claimed is:

1. An electric power generating device for a wearable object, the electric power generating device comprising:
   a transmission unit configured in the wearable object, for transferring an external force received by the wearable object to a driving force;
   a core configured in the wearable object, the core having a first end;
   a first coil coupled to the core;
   a magnetic permeable member configured in the wearable object and connected to the transmission unit, for receiving the driving force and moving by means of the driving force;
   a first magnetic member configured on the magnetic permeable member; and
   an electric power transforming module coupled to the first coil;
   wherein when the magnetic permeable member receives the driving force and moves, the magnetic permeable member pushes the first magnetic member to move to the first end, which results in the magnetic flux varied in the core to induce a first induced electromotive force in the first coil, and the electric power transforming module transforms the first induced electromotive force into an electricity.

2. The electric power generating device of claim 1, wherein the direction of the external force is different from that of the driving force.

3. The electric power generating device of claim 1, wherein the electric power transforming module is coupled to a lighting unit of the wearable object, and the electric power transforming module applies the power to the lighting unit to drive the lighting unit to light.

4. The electric power generating device of claim 3, wherein the electric power transforming module comprising:
   a diode electrically connected to the first coil;
   a capacitance electrically connected to the diode and the lighting unit; and
   a resistance electrically connected to the diode and the lighting unit, the resistance and the capacitance forming an RC circuit;
   wherein the first induced electromotive force induced by the varied magnetic flux in the first coil forms a current by means of the diode and the RC circuit to drive the lighting unit to light.

5. The electric power generating device of claim 1, further comprising:
   a second coil coupled to the core;
   wherein when the magnetic permeable member receives the driving force and moves, the magnetic permeable member pushes the first magnetic member to move, which results in the magnetic flux varied in the core, and a second induced electromotive force is induced by the varied magnetic flux in the second coil.

6. The electric power generating device of claim 5, wherein the circle number of the first coil is substantially the same as that of the second coil.

7. The electric power generating device of claim 1, further comprising:
   a second magnetic member configured on the magnetic permeable member and corresponding to the first magnetic member, the second magnetic member being close to a second end of the core;
   wherein when the magnetic permeable member receives the driving force and moves, the magnetic permeable member pushes the first magnetic member and the second magnetic member to move, which results in the magnetic flux varied in the core to induce a first induced electromotive force in the first coil.

8. The electric power generating device of claim 7 further comprising:
a second coil coupled to the core;
wherein when the magnetic permeable member receives the driving force and moves, the magnetic permeable member pushes the first magnetic member and the second magnetic member to move, which results in the magnetic flux varied in the core to induce a second induced electromotive force in the second coil.

9. The electric power generating device of claim 8, wherein the circle number of the first coil is substantially the same as that of the second coil.

10. The electric power generating device of claim 1, wherein the magnetic permeable member is used for receiving the driving force and pushing the first magnetic member to move by means of the driving force rotating around an axis.

11. A wearable object, comprising:
an electric power generating device comprising;
a transmission unit configured in the wearable object, for transferring an external force received by the wearable object to a driving force;
a core configured in the wearable object, the core having a first end;
a first coil coupled to the core;
a magnetic permeable member configured in the wearable object and connected to the transmission unit, for receiving the driving force and moving by means of the driving force;
a first magnetic member configured on the magnetic permeable member; and
an electric power transforming module coupled to the first coil;
wherein when the magnetic permeable member receives the driving force and moves, the magnetic permeable member pushes the first magnetic member to move, which results in the magnetic flux varied in the core to induce a first induced electromotive force in the first coil, and the electric power transforming module transforms the first induced electromotive force into an electricity.

12. The wearable object of claim 11, wherein the direction of the external force is different from that of the driving force.

13. The wearable object of claim 11 further comprising:
a lighting unit coupled to the electric power transforming module, the lighting unit lighting by receiving the power applied by the electric power transforming module.

14. The wearable object of claim 13, wherein the wearable object comprising:
a diode electrically connected to the first coil;
a capacitance electrically connected to the diode and the lighting unit; and
a resistance electrically connected to the diode and the lighting unit, the resistance and the capacitance forming an RC circuit;
wherein the first induced electromotive force induced by the varied magnetic flux in the first coil forms a current by means of the diode and the RC circuit to drive the lighting unit to light.

15. The wearable object of claim 11, wherein the electric power generating device further comprising:
a second coil coupled to the core;
wherein when the magnetic permeable member receives the driving force and moves, the magnetic permeable member pushes the first magnetic member to move, which results in the magnetic flux varied in the core, and a second induced electromotive force is induced by the varied magnetic flux in the second coil.

16. The wearable object of claim 15, wherein the circle number of the first coil is substantially the same as that of the second coil.

17. The wearable object of claim 11, wherein the electric power generating device further comprising:
a second magnetic member configured on the magnetic permeable member and corresponding to the first magnetic member, the second magnetic member being close to the second end of the core;
wherein when the magnetic permeable member receives the driving force and moves, the magnetic permeable member pushes the first magnetic member and the second magnetic member to move, which results in the magnetic flux varied in the core to induce a first induced electromotive force in the first coil.

18. The wearable object of claim 17, wherein the electric power generating device further comprising:
a second coil coupled to the core;
wherein when the magnetic permeable member receives the driving force and moves, the magnetic permeable member pushes the first magnetic member and the second magnetic member to move, which results in the magnetic flux varied in the core to induce a second induced electromotive force in the second coil.

19. The wearable object of claim 18, wherein the circle number of the first coil is substantially the same as that of the second coil.

20. The wearable object of claim 11, wherein the magnetic permeable member is used for receiving the driving force and pushing the first magnetic member to move by means of the driving force rotating around an axis.

* * * * *